(12) United States Patent
DeFabritis et al.

(10) Patent No.: US 6,217,809 B1
(45) Date of Patent: Apr. 17, 2001

(54) METHODS FOR SPLICING DIELECTRIC STRENGTH TAPES UTILIZED IN COMMUNICATION CABLES

(75) Inventors: Raymond P. DeFabritis; Richard D. Small, Jr., both of Lilburn; Carlos F. Solis, Atlanta; Priya L. Tabaddor, Alpharetta, all of GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/163,279

(22) Filed: Sep. 29, 1998

(51) Int. Cl.[7] ....................................................... B32B 31/00
(52) U.S. Cl. .................... 264/261; 156/49; 156/304.5; 264/259
(58) Field of Search ................... 156/49, 304.5; 264/259, 261

(56) References Cited

FOREIGN PATENT DOCUMENTS

973006 * 11/1959 (DE) .
1810369 * 4/1993 (SU) .

* cited by examiner

Primary Examiner—Francis J. Lorin
(74) Attorney, Agent, or Firm—Alston & Bird LLP (57) ABSTRACT

A method for splicing an improved strength tape having longitudinally extended strands comprises the trimming or patterning of the strands of the respective ends that are to be joined so that the ends can be mated together in a meshing arrangement. The two ends are placed in a splicing tray. An adhesive film is interposed between the two ends and the splice tray is closed. The splice tray is placed in a compression molding press which applies a predetermined time-temperature-pressure treatment profile which cures the adhesive film. The resulting splice has essentially the same physical dimensions of the strength tape, and similar stiffness characteristics to that of the strength tape. Further, the strength of the splice is more than sufficient for use in a communication cable. Because the complete splice process can be completed in less than 4 to 5 minutes, the splice can be performed on-line with the use of a strength tape accumulator.

25 Claims, 7 Drawing Sheets

METHODS FOR SPLICING DIELECTRIC STRENGTH TAPES UTILIZED IN COMMUNICATION CABLES

TECHNICAL FIELD

The present invention generally relates to optical cable, and more particularly, to the dieletric strength tape utilized as a strength member in optical cable.

BACKGROUND OF THE INVENTION

Optical cable is widely used as a communication medium in both public and private communication networks. Optical cable comprises glass or plastic fibers that are relatively fragile, and require strength members for protection from tensile stress during processing, installation, and servicing. It is known that excess tensile stress may cause the optical characteristics of the fibers to change, resulting in transmission loss. Accordingly, a variety of different strength system designs for optical cables have been proposed for the protection of the transmission integrity of the fibers contained therein.

Strength system designs typically include the use of rigid strength rods or flexible members made from materials such as steel, KEVLAR® (a registered trademark of E. I. du Pont de Nemours and Company), epoxy/aramid, epoxy/glass, etc. The rigid strength members may form the core of an optical cable, wherein the optical fibers are packaged into one or more plastic buffer tubes that are stranded around the strength member. Alternatively, fiber bundles or ribbons may be disposed in the central portion or core of the optical cable, wherein the strength members are disposed outside the core, typically embedded within the optical cable jacket.

An improved strength member which provides advantageous strength and flexibility characteristics has been developed by Lucent Technologies, Inc. The improved strength member comprises a strength tape that wraps around a core fiber bundle. The strength tape includes a plurality of strands that are woven together into a linear strength tape, as described in greater detail below.

However, there exist practical limits to the maximum length of the strength members utilized in an optical cable. Depending upon the type of strength members utilized, the maximum length of the strength members may be less than the desired length of the optical cable. The maximum length of the strength members may be limited by numerous factors such as material characteristics, fabrication techniques, size and weight considerations, etc.

One technique for extending the length of a strength member is to splice two strength members together so that the combined length is suitable for the particular optical fiber cable being manufactured. A strength member splice has to meet specific requirements in order to be an acceptable method for extending the length of the strength member. For instance, the splice may be required to meet predetermined benchmarks for strength, stiffness, aging, size, and outgassing. In addition, it is desirable to be able to splice strength members on-line during manufacture of the optical cable, and therefore, the method should take a minimum amount of time to complete, and be user friendly.

Therefore, a need exists in the industry for splicing techniques for strength members, such as strength tapes, wherein the physical length of the strength members is less than the desired length of the optical cable. Preferably, the splicing technique is compatible with the manufacturing process of the optical cable so that the splice can be made on-line.

SUMMARY OF THE INVENTION

A method for splicing a strength tape having longitudinally extending strands comprises the trimming or patterning of the strands of the respective ends that are to be joined so that the ends can be mated together in a meshing arrangement. An adhesive film is interposed between the two ends and then cured under the application of heat and pressure for a predetermined period of time. The resulting splice has essentially the same physical dimensions of the strength tape, and similar stiffness characteristics to that of the strength tape. Further, the strength of the splice is more than sufficient for use in an optical cable. Because the complete splice process can be completed in less than 4 to 5 minutes, the splice can be performed on-line with the use of a strength tape accumulator, which is particularly advantageous.

In accordance with an illustrated embodiment of the present mention, a method for splicing dielectric strength tape utilized in an optical cable as a strength member comprises the steps of placing a first end of a first strength tape in mating alignment with a second end of a second strength tape, placing a bonding agent adjacent to the first end and the second end, and curing the bonding agent to complete the splice between the first end and the second end. In order to place the first end and the second end in a mating alignment, the strands of the first strength tape and second strength tape may be selectively cut so the first end and the second end conform to one another. That is, the first end and the second end may be patterned so that the first end and second end align in a meshing arrangement.

The bonding agent placed adjacent to the first end and second end preferably comprises a heat activated, dry film adhesive. The adhesive film may be placed between the first and second ends, or alternatively, on either side of the aligned first and second ends. In addition, a first segment of adhesive film may be placed adjacent to the terminating point of the first end and a second segment of adhesive film may be placed adjacent the terminating point of the second end to further secure the terminating points of the respective ends.

The bonding agent may be cured by the application of a predetermined time-temperature-pressure process treatment. This may be achieved through the use of a splice tray within which the first end and second end are placed in mating alignment. Preferably, a release agent is deposited between the strength tape and the splice tray in order to facilitate removal of the splice following the curing of the bonding agent.

In accordance with another illustrated embodiment of the invention, a method of splicing dielectric strength tape utilized in an optical cable comprises the steps of trimming the first end of the first strength tape and trimming the second end of the second strength tape so that the first end and the second ends form mating ends. The first end is placed in a splice tray and an adhesive film is placed over the first end within the splice tray. The second end is placed over the adhesive film in the splice tray so that the first end and second end are in mating alignment. The splice tray may then be closed and the adhesive film is cured so as to complete the splice between the first end and second end. The curing process may comprise applying a heat and pressure processing treatment to the first and second ends in the splice tray for a predetermined period of time preferably approximately 40–55 seconds. The heat and pressure processing treatment preferably comprise temperatures of approximately 440–450° F., and 3900–4100 lbs. of force.

Following the heat and pressure process treatment, the splice may be removed from the splice tray and the adhesive film flashing removed. The depositing of a release agent between the strength tapes and the splice tray may enhance the removal of the splice from the splice tray.

The step of trimming the first end and second end may comprise trimming alternating strands of the respect first and second ends. The strands may be trimmed such that the lengths of the trimmed strands are substantially equal, and different from the length of the untrimmed strands. Alternatively, the strands may be trimmed such that the respective alternating strands have different lengths. Accordingly, the mating interface between the first end and the second end may be perpendicular to the direction of the strands, diagonal to the directions of the strands, or symmetrically staggered in the direction of the strands.

Other features and advantages of the present invention will become apparent to one skilled in the art upon examination of the following drawings and detailed description. It is intended that all such features and advantages be included herein within the scope of the present invention, as defined by the appended claims.

BRIEF DESCRIPTION OF THE DRAWINGS

The present invention can be better understood with reference to the following drawings. The elements of the drawings are not necessarily drawn to scale, emphasis instead be placed upon clearly illustrating principles of the present invention. Furthermore, like reference numerals designate corresponding parts throughout the several views.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited by the embodiments set forth herein. Moreover, these embodiments are provided so that the disclosure will be thorough and complete, and will fully convey the scope of invention to those skilled of the art.

Improved Strength Tape

Figure 8:
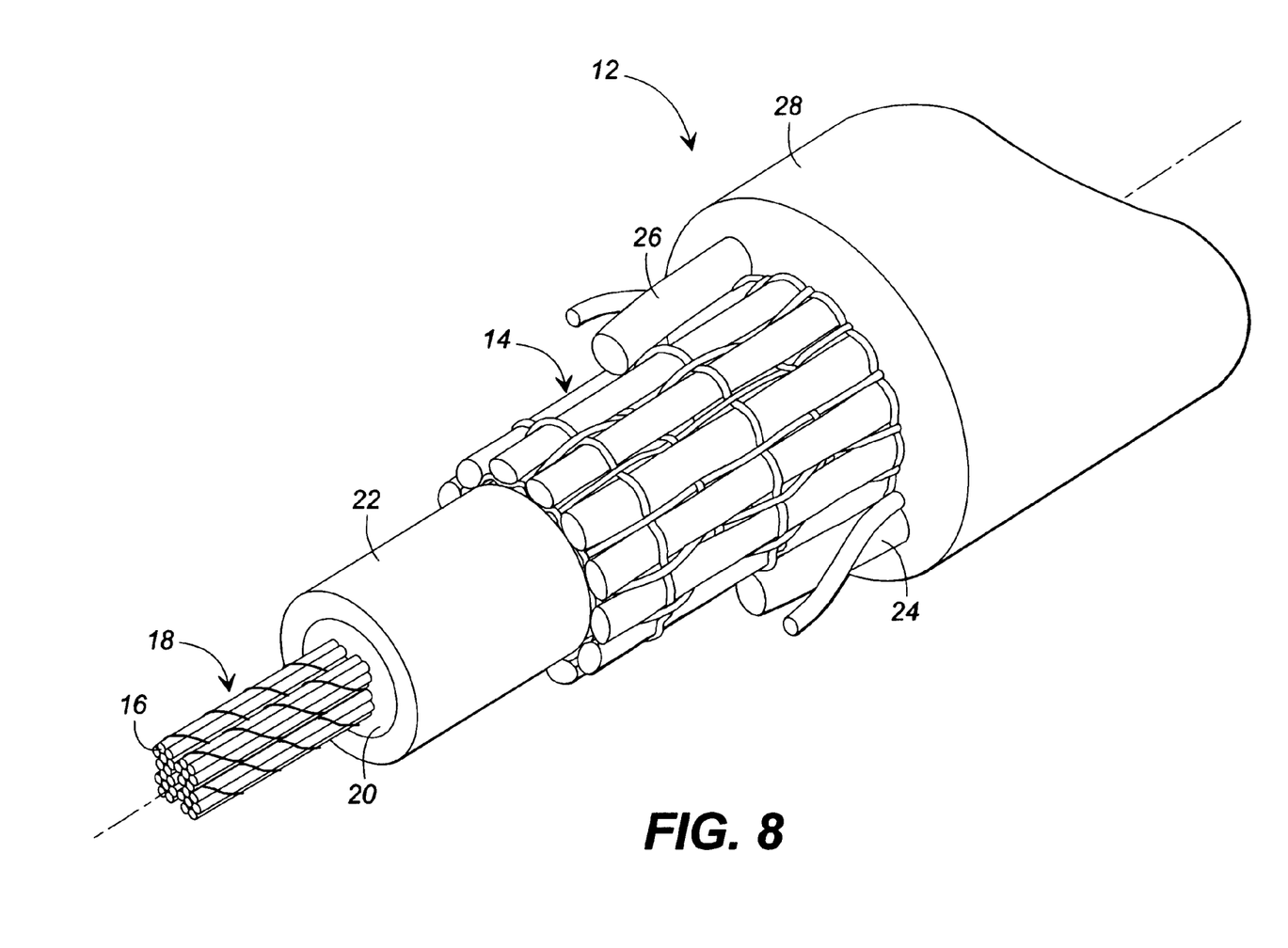
FIG. 8 is a perspective view of an optical cable having an improved strength system comprising a strength tape.

Reference is made to FIG. 8 which shows an optical-fiber cable 12 which incorporates an improved strength tape 14 wrapped around the core of the cable 12. The core includes one or more optical fibers 16 which form a bundle 18. The bundle 18 is embedded within a water blocking filling material 20 which is surrounded by a core tube 22. The improved strength tape operates in conjunction with strength rods 24, 26 to provide a strength system for cable 12. A plastic jacket 28 is extruded onto the above-described cable components to provide additional strength and protection from the environment.

Figure 9:
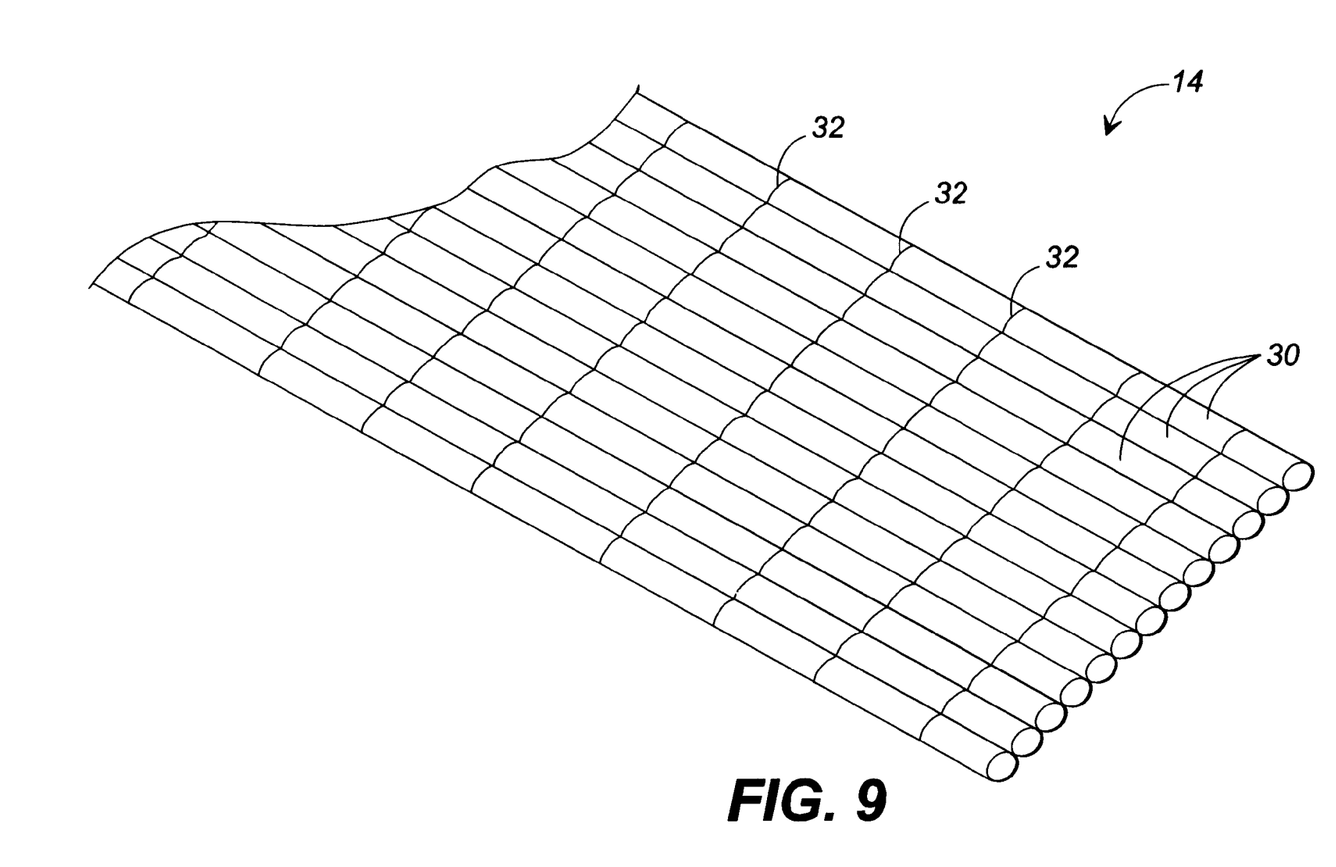
FIG. 9 is a perspective view of the linear strength tape of FIG. 8.

Of particular interest with regard to cable 12 is the strength tape 14, which is shown in greater detail in FIG. 9. The strength tape 14 comprises a linear array of flexible strands 30 having high tensile stiffness, but having little or no compressive stiffness. The flexible strands 30 can be glass or aramid yarns that are prefabricated into a tape before being installed onto the core tube 22 of cable 12. As an example, the flexible strands 30 may be made from Hercuflex™ fiberglass strands, which are commercially sold by PPG Industries, Inc., and are available in several configurations including HF 4000 which has 4000 filaments per strand. In the illustrative embodiment of strength tape 14, 13 strands of HF 4000 are utilized. The flexible strands 30 are woven together using suitable yarn materials such as, but not limited to, polyester, nylon, cotton or wool, thereby forming a weaving 32. Currently, the flexible strength tape 14 enables communication cables to be constructed to have high tensile stiffness and flexibility without resorting to expensive helical application of strength members or faulty loosetube designs. A more detailed explanation of an optical cable having the improved strength tape 14 can be found in U.S. Pat. No. 5,838,864, entitled "Optical Cable Having An Improved Strength System," filed Apr. 30, 1997, and having Ser. No. 08/846,719, the complete disclosure of which is incorporated herein by reference as is set forth in full.

However, there exists a limit to the length to which the strength tape 14 can be fabricated, which is less than a single optical-cable production run. Currently, strength tape 14 is produced in rolls of up to 30,000 feet, though optical cable is oftentimes manufactured in lengths of up to 40,000 feet or more. While the strength tape 14 may be produced in longer lengths, the cost of the specialized machinery and/or special handling considerations for spools containing that amount of tape are essentially prohibitive. Therefore, in order to take full advantage of the strength tape 14, the present invention provides a method for splicing the strength tape 14 that produces a splice with desirable dimensional and mechanical properties, and that can be performed in an expeditious manner as required for an on-line process. Further, the splicing method of the present invention is user-friendly and robust enough to be essentially trouble free during on-line processing.

Splice Methods

The present invention provides methods for splicing dielectric strength tape incorporated into communication cable designs to provide tensile strength during processing, installation and servicing, and for protection from lightning strikes during service. While the strength tape described above is described in connection with an 600 pound optic-fiber cable, it will be recognized by those skilled in the art that the present method can be utilized to splice dielectric strength tape utilized in connection with other communication means, such as electrical conductors. Further, while the dielectric strength tape described herein has 13 strands, it will be recognized by those skilled in the art that two strength tapes having more or less than 13 strands may be spliced in accordance with the present invention by scaling and/or adapting the teachings herein.

Figure 1:
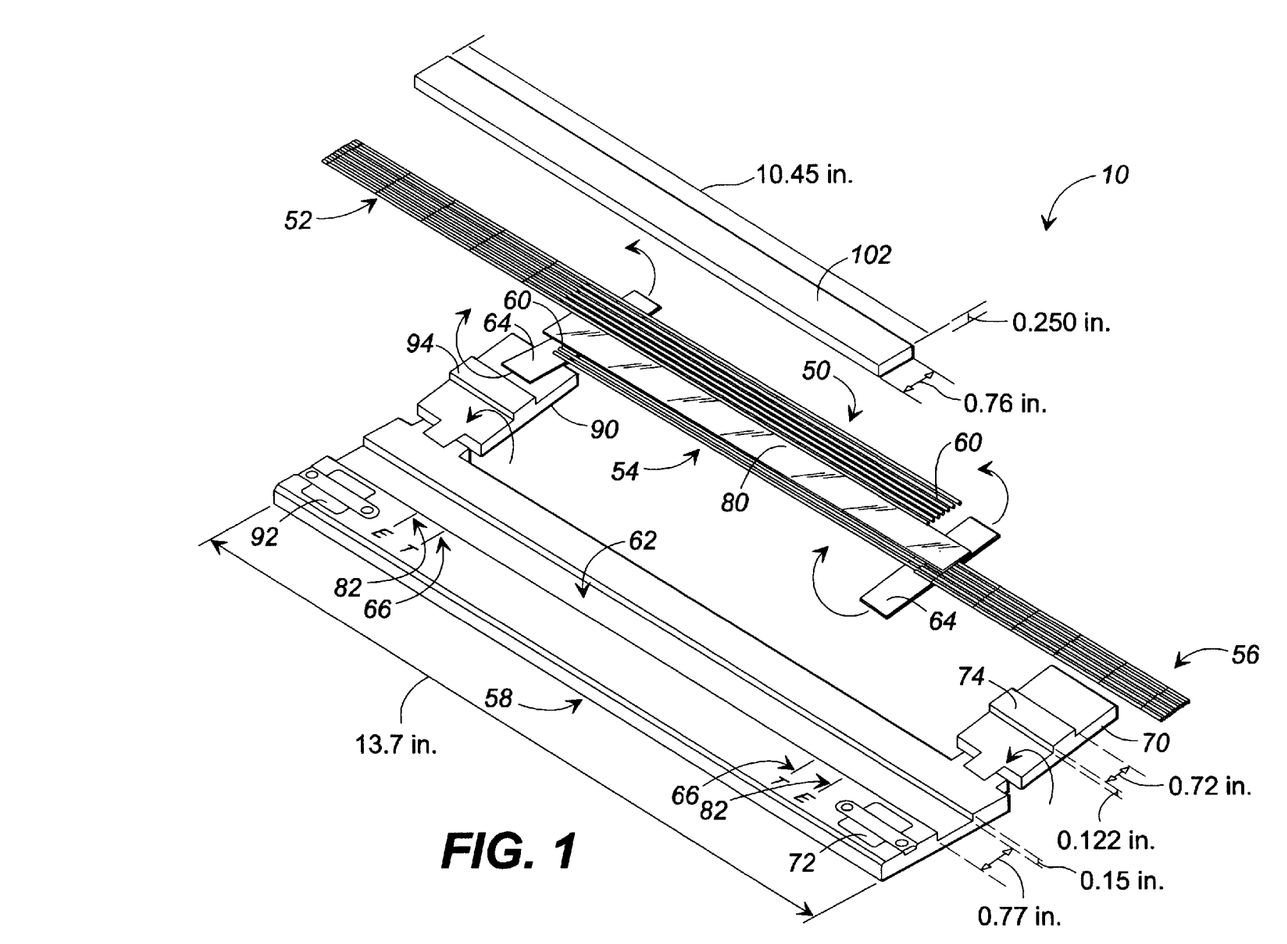
FIG. 1 is an exploded perspective view of two strength tapes being spliced together in accordance with an embodiment of the present invention.
Figure 2:
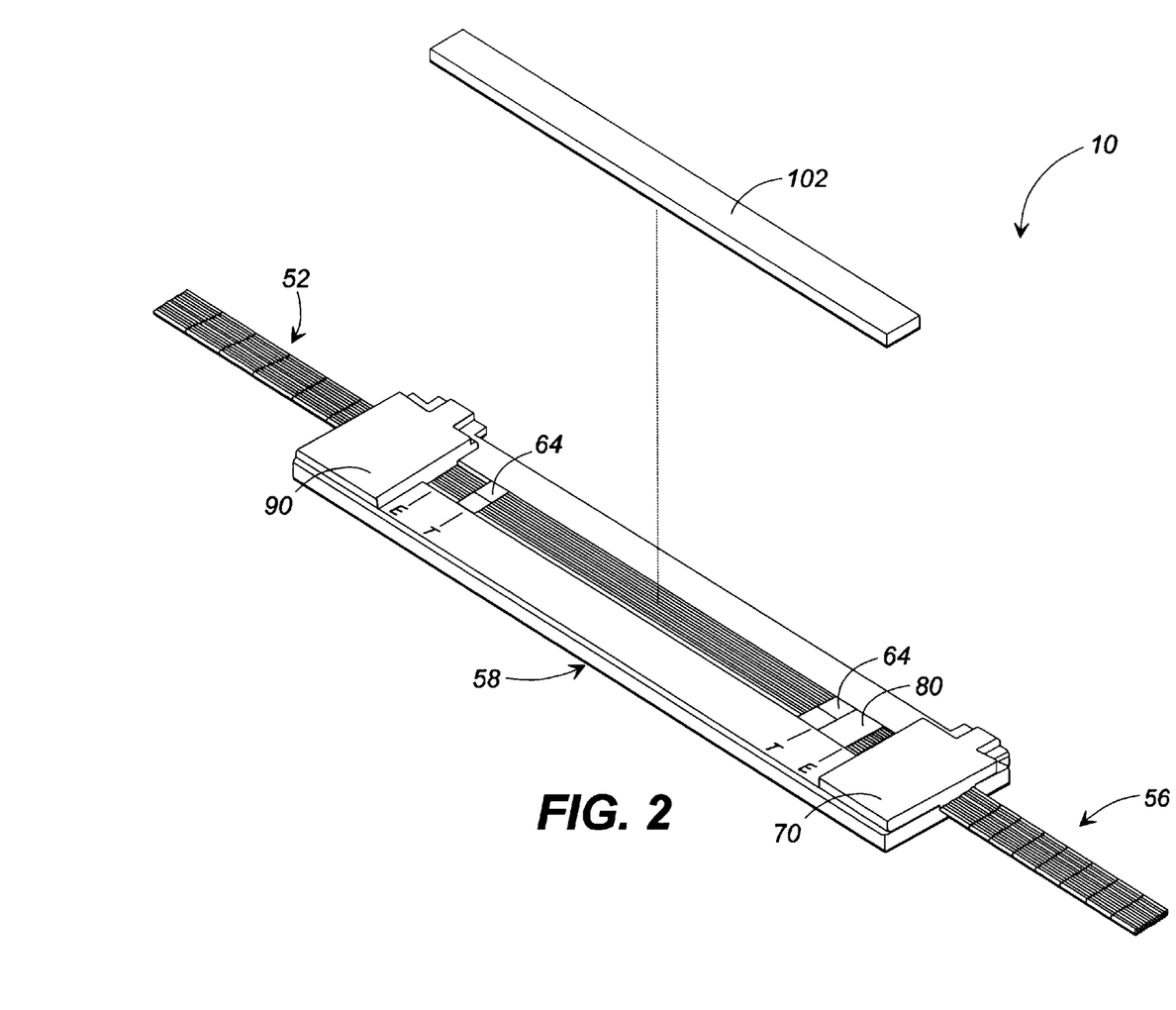
FIG. 2 is a perspective view of the splice tray with two strength tapes that are prepared to be spliced together, wherein the pressure plate is removed to reveal the splice region.

With general reference to FIGS. 1 and 2, an exemplary embodiment of a splice tray assembly 10 in accordance with the present invention is illustrated. In particular, an active end 50 of a dielectric strength tape 52 is being spliced to a free end 54 of dielectric strength tape 56 in accordance with the present invention. For purposes of the present disclosure, an active end is the end of the spool of strength tape that is already a part of the cable production process, and a free end is the leading end of a next spool that is to become part of the cable production process. The active end 50 and free end 54 are prepared for the splice and then placed in a splicing tray 58 in a mating alignment with one another.

Figure 3:
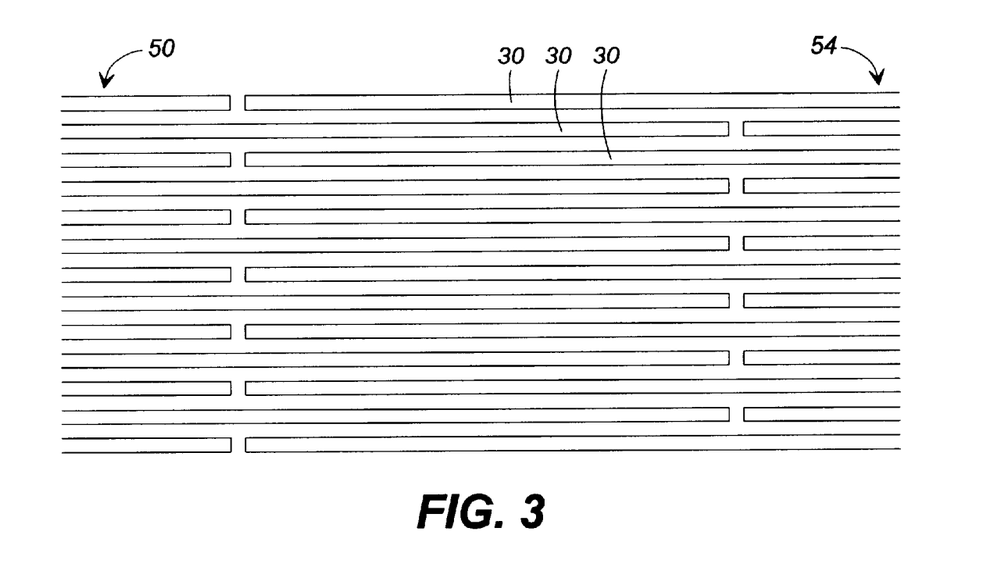
FIGS. 3–6 are top plan views of the mating alignment for illustrative splice patterns.
Figure 4:
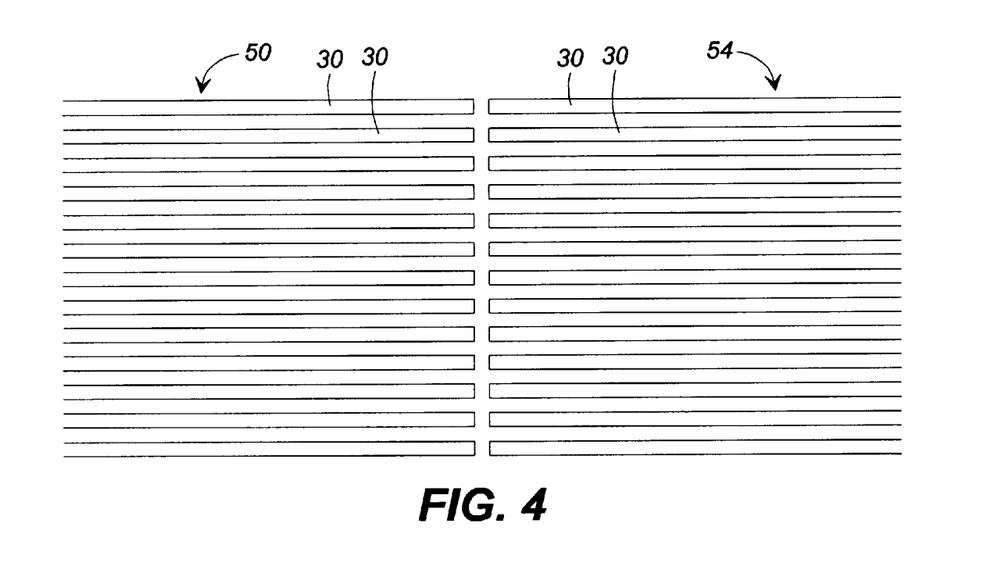
Figure 5:
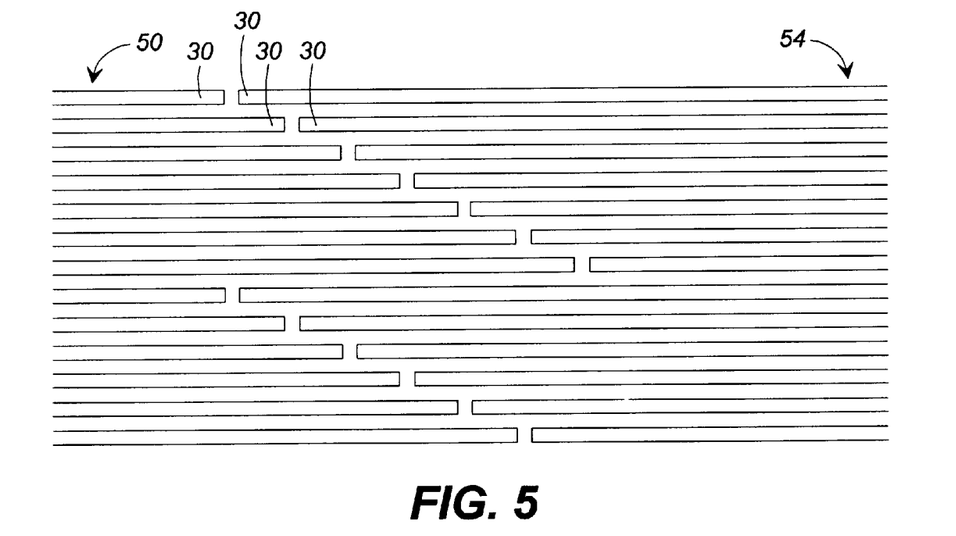
Figure 6:
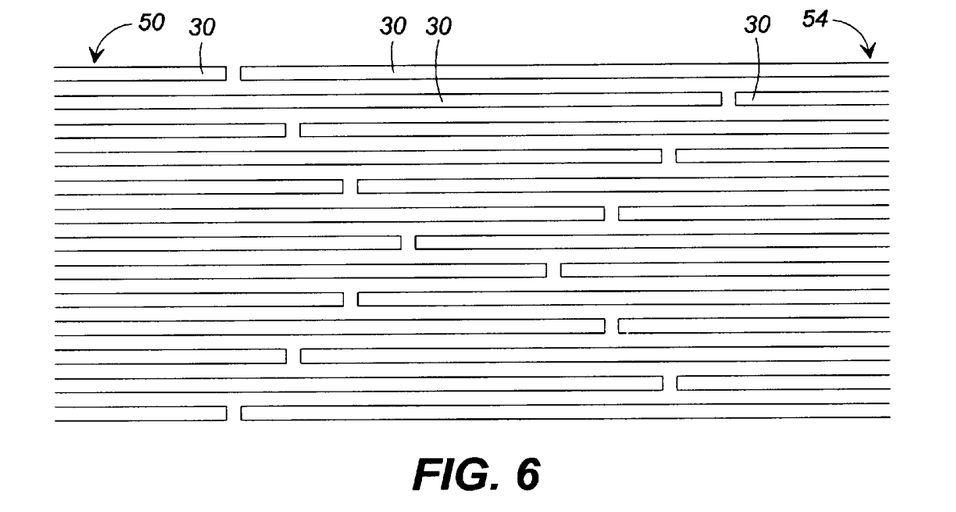

The respective ends 50,54 are prepared in basically the same manner as described hereinafter with respect to free end 54. A perpendicular cut is initially made at a terminating end 60 of the strength tape so that the strands 30 are of substantially equal length. The weaving 32 is pulled back out of the way, revealing the strands 30. The strands 30 are selectively cut in a predetermined pattern so that the respective ends 50,54 can be aligned in a meshing arrangement. Said another way, the respective ends are cut substantially equal and opposite amounts for most any cut pattern other than a perpendicular cut. Illustrative cutting patterns are shown in FIGS. 3–6. In the preferred embodiment, which is illustrated in FIG. 3, every other strand 30 of the respective ends 50,54 is cut to the same length. This pattern forms an essentially symmetrically staggered splice seam. Alternatively, as illustrated in FIG. 4, the two ends are patterned so as to form a substantially perpendicular splice seam. Other patterns, as illustrated in FIGS. 5 and 6, form a zigzag splice seam and an X splice seam, respectively. These are just a few illustrative splice seams which would be suitable for the present invention.

While a variety of different splice seam configurations may be utilized in connection with the present invention, consideration should not only be given to the strength of the resulting splice, but also to the ease with which the necessary cuts are made. The cuts may be made with hand-held scissors, as in the preferred embodiment, which favors a relatively simple pattern. More complex patterns may make it desirable to use a cutting or marking template to ensure accurate matching of the ends 50, 54.

Once the respective ends 50, 54 have been patterned, the ends are ready to be placed in the splice tray 58. The splice tray 58 is preferably machined out of aluminum. Aluminum is a particularly desirable material because of its high rate of thermal conductivity. The splice tray in the preferred embodiment is 13.7 inches long, with a longitudinally extending groove 62. The groove 62 is 0.15 inches deep and 0.77 inches wide, as indicated.

Alternatively, a section of about six inches in length located at the center of the groove 62 may have a wider width, for example, 0.85 inches. This reduces the thickness of the splice region because of the added area for the splice region to laterally expand under the pressure during processing. Thus, while the resulting splice is thinner, it is slightly wider in the splice region. The added width in the splice region can be subsequently removed by trimming the width down with a knife or bladed device so that the splice region has the same width of the strength tape. However, the enlarged width section in the center of the groove may make the splice tray 58 more difficult to fabricate.

Before placing the ends 50,54 in the splice tray 58, it is preferred that a release agent be applied to the splice tray 58 in order to facilitate removal once the splice has been made. A suitable release agent is Miller-Stephenson TFE (Teflon) Release Agent Dry Lubricant, type MS-122N/CO2.

If desired, a perpendicular adhesive wrap 64 may be transversely placed in a longitudinal groove 62 of splice tray 58 prior to placing the ends 50,54 in the splice tray so that the adhesive wrap 64 is centrally aligned with regard to alignment marker T, as denoted by reference numeral 66. The adhesive wraps 64 are wrapped around the terminating ends 60 of the respective strength tapes and the overlapping portion of the other strength tape to prevent peeling or lifting of the terminating ends 60 during subsequent processing. Preferably, the adhesive wraps 64 are approximately 1 inch in width by 1¾ inches in length. The adhesive wraps 64 are preferably made of a bonding agent such as Scotch-Weld™ Brand 588 bonding film, which is commercially available from 3M, Inc., St. Paul, Minn. This adhesive film is a heat activated, dry film adhesive comprising synthetic elastometer, thermoplastic and thermosetting resins. Advantageously, this adhesive film has a single curing process that enables the film to quickly achieve mechanical integrity within the splice region so that the splice can be performed on-line during manufacturing of the optic cable. It is noted, however, that suitable splices for certain applications may be achievable without the use of adhesive wraps 60.

The free end 54 is placed in the groove 64 so that the terminating end 60 of end 54 aligns with the alignment marker T, denoted by reference numeral 66, as shown. A hold-down clamp 70 is closed over the strength tape 56 to hold the free end 54 in place. The hold-down clamp is held in place by a magnet 72, or other suitable means. The hold-down clamp 70 includes a ridge 74 which is sized and shaped to fit within groove 64 and firmly secure the strength tape. For example, in the preferred embodiment, the ridge 74 is 0.72 inches wide, 1.6 inches long, and 0.122 inches tall.

An adhesive film 80 is then placed over the free end 54 so that the ends of adhesive film 80 are aligned with alignment markers E, denoted by reference numeral 82. In the preferred embodiment, the adhesive film 80 comprises Scotch-Weld Brand 588 adhesive film, as described above. This adhesive is particularly advantageous for use as described herein because it has a one step curing cycle and can quickly achieve mechanical integrity within the splice region. In the preferred embodiment, the adhesive film has a length of 9.5 inches and a width of 0.70 inches.

In an effort to expedite the splicing process, it is noted that each of the steps described above can be performed prior to preparing the active end 50. Therefore, the time spent to this point preparing the splice does not count towards the on-line splice time. Thus, where the on-line splice must occur within a limited amount of time, which is most likely determined by the size of the accumulator associated with the strength tape, a significant portion of the splice preparation can be performed prior to activating the strength tape accumulator. For instance, prior to activating the accumulator, which may only provide 4–5 minutes within which to perform the splice, the preparation of the free end 56 may be performed, as described above. Thereafter, once the accumulator is activated, the active end is prepared in substantially the same manner as the free end 54, as described below. It is noted, however, if the splice is not being performed on-line, then the order of preparation and placement in the splice tray 58 of the respective ends 50,54 is not necessarily critical.

A perpendicular cut is made at the terminating end 60 of the active end 50, and the tape is patterned to match the free end 54 in a mating alignment. The active end 50 is then placed over the adhesive film 80 in the groove 64 so that the terminated end 60 aligns with the alignment marker T, denoted by reference numeral 66, as shown. The overlap region of the active end 50 and free end 54 is approximately 8 inches in the preferred embodiment, though an optimum range is between 6–10 inches. It was empirically determined that overlaps of greater than 8 inches have only a nominal improvement in splice strength, yet cause an undesirable increase in the stiffness. It was further determined that variations in the splice seam configuration and overlap regions may be desirable for use with communication cables having different strength, flexibility and dimensional requirements.

A hold-down clamp 90 is then closed over the active end 50 and is held in place by a magnet 92. A ridge 94 on the hold-down clamp 90 fits within the groove 64 and secures the active end 50 in place. If adhesive wraps 64 are utilized, then the adhesive wraps are folded over the ends 50,54 to form a wrap around the respective terminating ends 60, as best illustrated in FIG. 2. A pressure plate 102 is then placed in the groove 58, over the ends 50,54. The pressure plate 102 is sized and shaped to abut hold-down clamps 70, 90 when placed in groove 58, completing the splice tray assembly 10. For example, the pressure plate 102 may have a length of 10.45 inches and a width of 0.76 and a height of 0.25 inches. An alternative to the free floating pressure plate design described is a fixed pressure plate design, as will be appreciated by those skilled in the art.

The splice tray assembly 104 is then placed into a compression molding press which will apply a time-temperature-pressure process treatment to the splice assembly to cure the adhesive film 80 (and adhesive wraps 64 if utilized). It has been determined that a preferred time-temperature-pressure profile for the bonding agent utilized comprises 4000 lbs. of clamping force at 450° F. for approximately 50 seconds. Thereafter, the compression molding press should apply a cooling cycle for approximately 50 seconds. Variations in the time-pressure-cooling profiles may be made in order to achieve specific splice characteristics and/or to cure different bonding agents, as will be appreciated by those skilled in the art. The splice tray assembly 104 can then be removed from the press. The pressure plate and hold-down clamps can then be opened and the spliced strength tape lifted from the splice tray 58. If necessary, a cutting device such as a razor blade or knife may be used to trim off any cured flashing from the adhesive film 80 and/or adhesive wraps 64.

An example of suitable compression molding press is the Wabash Genesis Series Hydraulic C-Frame Crest, model CG15H-CLPX, which is capable of producing the clamp force, temperature and cooling cycle requisite for the preferred embodiment described herein.

Accordingly, the on-line splicing time may be approximately 3–4 minutes, or less. The splice strength (i.e., tensile load at break) of the preferred embodiment is greater than 900 lbs., and the tensile stiffness is greater than 800 lb/% strain. Further the thickness of the splice region is essentially the same as that of the strength tape, which is approximately 0.035 inches thick by 0.76 inches wide. The splice of the preferred embodiment also meets all the requirements of Bellcore GR-20 Aging Requirements for 600 lbf. Fiber-Optic Cable (e.g., 85° C./85% RH in air for 30 days, 85° C. with water blocking compounds for 45 days, and 85° C. in mineral oil for 7 days then 85° C./85% RH in air for 7 days). Accordingly, the present invention provides for a method of splicing dielectric strength tapes utilizing a one step curing process that produces a splice with satisfactory dimensional and mechanical properties. Further, the splice can be made in an expeditious manner so as to be performed in an on-line process, and is robust enough to be trouble free during production.

In order to obtain a splice of relatively greater tensile strength without limitation to the thickness of the splice region, the active end and the free end may be overlapped without trimming or patterning their ends. The overlapping ends of the strength tapes may have the respective weavings split up the middle of the strength tapes for 4 to 5 inches in the middle of the overlap region of the splice. This yields a thickness that ranges from 0.038 to 0.046 inches across the splice region using a splice tray having a groove with a width of 0.85 inches. Alternatively, a splice tray having a groove with a width of 0.75 inches yields a thickness ranging from 0.05 to 0.058 inches in the splice region. It has been empirically determined that these modifications may produce an increase in tensile strength and stiffness up to 50 percent.

Figure 7:
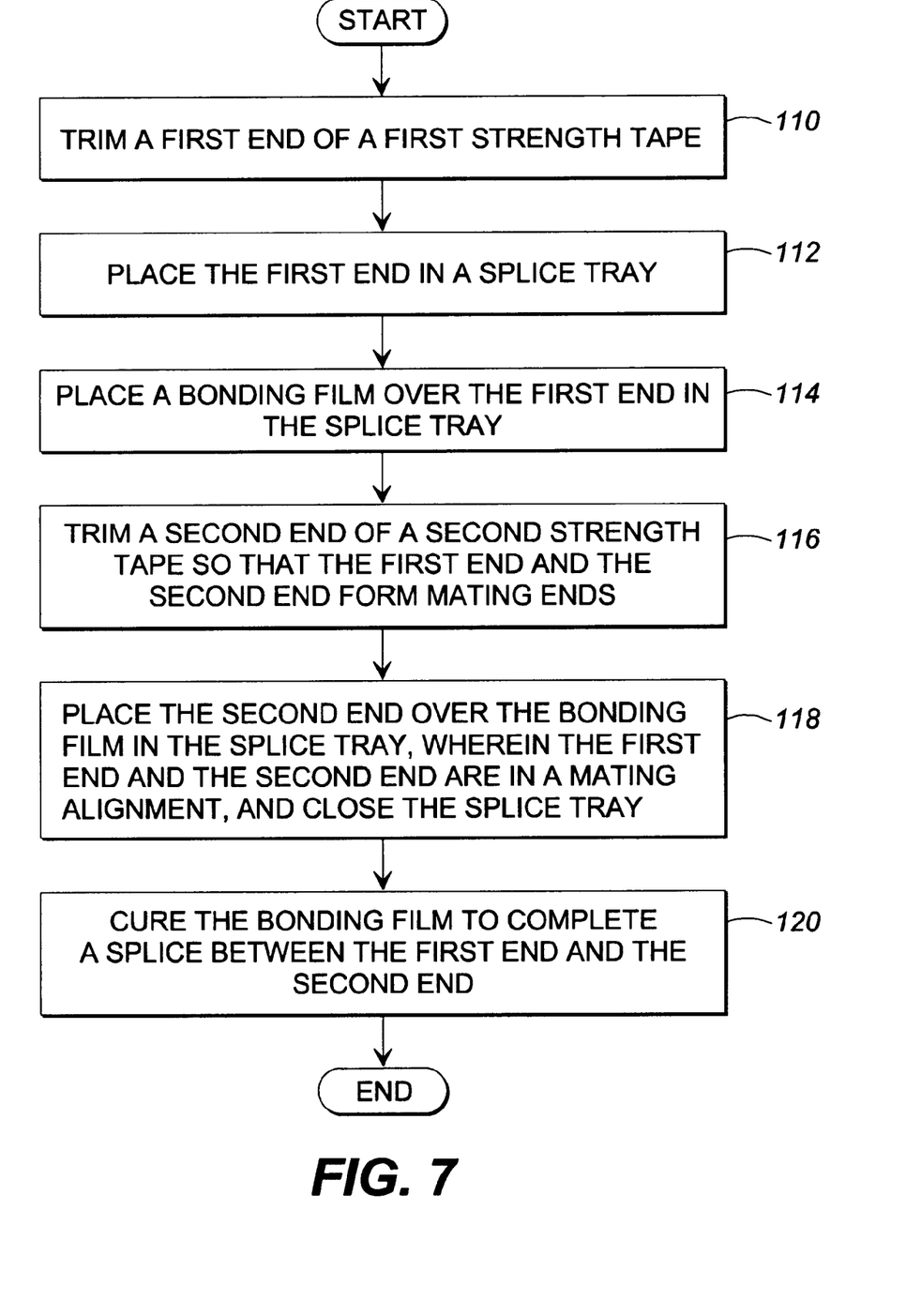
FIG. 7 is a flowchart of an illustrative method for splicing strength tape in accordance with one embodiment of the present invention.

With reference to FIG. 7, a method for splicing dielectric strength tapes in accordance of the present invention may be summarized as follows. Initially, a first end of a first strength tape should be trimmed, as indicated by block 110. The first end may then be placed in the splice tray, as indicated by block 112. At block 114, an adhesive film is placed over the first end within the splice tray. A second end of a second strength tape may then be trimmed so that the first end and a second end form mating ends, as indicated by block 116. The second end may then be placed over the adhesive film in the splice tray, wherein the first and the second ends are in a mating alignment, and then the splice tray may be closed, as indicated by block 118. At block 120, the adhesive film is cured so as to form a splice between the first end and the second end.

The foregoing is illustrative of the present invention and is not to be construed as limiting thereof. Although a few exemplary embodiments of this invention have been described, those with a skill in the art would readily appreciate that many modifications and variations are possible in the exemplary embodiments without materially departing from the teachings and advantages of this invention. Accordingly, all such modifications and variations are intended to be included within the scope of this invention as defined in the claims.

What is claimed is:

1. A method for splicing two dielectric strength tapes, each strength tape having a longitudinal axis, utilized in an optic cable as a strength member, comprising the steps of:

patterning a first end of a first strength tape and a second end of a second strength tape, wherein said patterning of the first end produces a plurality of terminations, with a first termination longitudinally offset in the same direction with respect to both a second termination and a third termination, and wherein the second termination and the third termination are disposed on opposite sides of the first termination;

placing the first end of the first strength tape in mating alignment with the second end of the second strength tape;

placing a bonding agent adjacent the first end and the second end; and curing the bonding agent to complete a splice between the first end and the second end.

2. The method of claim 1, wherein said step of placing a bonding agent adjacent the first end and the second end comprises the step of placing an adhesive film adjacent the first end and the second end.

3. The method of claim 2, wherein said step of placing an adhesive film adjacent the first end and the second end comprises the step of placing an adhesive film between the first end and the second end.

4. The method of claim 2, further comprising the step of placing a first segment of adhesive film adjacent an end point of the first end and a second segment of adhesive film adjacent an end point of the second end.

5. The method of claim 1, wherein said step of curing the bonding agent comprises the step of applying a heat and pressure process treatment to the bonding agent.

6. The method of claim 1, wherein said step of placing a first end of a first strength tape in mating alignment with a second end of a second strength tape comprises the step of placing the first end and second end in a splice tray.

7. The method of claim 6, further comprising the step of depositing a release agent between the first and second ends and the splice tray before said step of placing the first end in the splice tray.

8. The method of claim 1, wherein said step of placing the first end and the second end in mating alignment comprises the step of selectively cutting strands of the first strength tape and the second strength tape.

9. A method for splicing dielectric strength tape utilized in a fiber optic cable, comprising the steps of:
   trimming a first end of a first strength tape;
   trimming a second end of a second strength tape so that the first end and the second end form mating ends;
   placing the first end in a splice tray;
   placing an adhesive film over the first end in the splice tray;
   placing the second end over the adhesive film in the splice tray, wherein the first end and the second end are in a mating alignment; and
   curing the adhesive film to complete a splice between the first end and the second end.

10. The method of claim 9 wherein said step of curing comprises simultaneously applying a heat and pressure processing treatment to the first and second ends in the splice tray for a predetermined period of time.

11. The method of claim 10, wherein said step of applying a heat and pressure processing treatment comprises the step of applying approximately 400–475° F.

12. The method of claim 10, wherein said step of applying a heat and pressure treatment comprises the step of applying approximately 2000–4200 pounds of force.

13. The method of claim 9, wherein said step of placing the first end in the splice tray comprises the step of placing the first end in a groove in the splice tray.

14. The method of claim 9, wherein said step of placing the adhesive film comprises the step of placing a heat activated, dry film adhesive over the first end.

15. The method of claim 9, further comprising the step of depositing a release agent between the first and second ends and the splice tray before said step of placing the first end in the splice tray.

16. The method of claim 9, wherein said step of trimming the first end comprises the step of trimming alternating strands of the first strength tape.

17. The method of claim 16, wherein said step of trimming alternating strands comprises the step of trimming the alternating strands of the strength tape to a first length that is different from a length of the remaining strands.

18. The method of claim 16, wherein said step of trimming alternating strands comprises the step of trimming the alternating strands of the strength tape to a different respective lengths.

19. The method of claim 9, further comprising the step of removing the adhesive film flashing after said step of curing the adhesive film.

20. The method of claim 9, further comprising the step of placing a first adhesive wrap adjacent an end point of the first end and a second adhesive wrap adjacent an end point of the second end.

21. The method of claim 9, wherein said step of curing comprises the step of applying a heat and pressure processing treatment for a period of approximately 40–55 seconds.

22. The method of claim 9, further comprising the step of closing the splice tray prior to curing the adhesive film, wherein said step of closing the splice tray comprises the step of placing a pressure plate in an operative position with respect to the overlapping portions of the first end and the second end.

23. The method of claim 9, wherein said step of trimming the second end comprises the step of trimming the second end to create a mating interface that is substantially perpendicular to a direction of the strands of the strength tape.

24. The method of claim 9, wherein said step of trimming the second end comprises the step of trimming the second end to create a mating interface that is diagonal to a direction of the strands of the strength tape.

25. The method of claim 9, wherein said step of trimming the second end comprises the step of trimming the second end to create a mating interface that is symmetrically staggered in a direction of the strands of the strength tape.

* * * * *